United States Patent
Kösters et al.

(10) Patent No.: US 11,802,562 B2
(45) Date of Patent: Oct. 31, 2023

(54) DEVICE AND METHOD FOR EVACUATING A CHAMBER AND PURIFYING THE GAS EXTRACTED FROM SAID CHAMBER

(71) Applicants: Heiner Kösters, Itzehoe (DE); Uwe Gottschlich, Hohenaspe (DE)

(72) Inventors: Heiner Kösters, Itzehoe (DE); Uwe Gottschlich, Hohenaspe (DE)

(73) Assignee: Sterling Industry Consult GmbH, Itzehoe (DE)

( * ) Notice: Subject to any disclaimer, the term of this patent is extended or adjusted under 35 U.S.C. 154(b) by 457 days.

(21) Appl. No.: 17/015,590

(22) Filed: Sep. 9, 2020

(65) Prior Publication Data

US 2020/0408211 A1 Dec. 31, 2020

Related U.S. Application Data

(62) Division of application No. 14/364,802, filed as application No. PCT/EP2012/075262 on Dec. 12, 2012, now abandoned.

(30) Foreign Application Priority Data

Dec. 14, 2011 (EP) ...................................... 1193573

(51) Int. Cl.
*F04C 19/00* (2006.01)
*F04C 25/02* (2006.01)
(Continued)

(52) U.S. Cl.
CPC ............ *F04C 19/004* (2013.01); *B01D 47/00* (2013.01); *F04C 23/005* (2013.01); *F04C 25/02* (2013.01);
(Continued)

(58) Field of Classification Search
None
See application file for complete search history.

(56) References Cited

U.S. PATENT DOCUMENTS 3,956,072 A 5/1976 Huse
4,225,288 A 9/1980 Mugele et al.
(Continued)

FOREIGN PATENT DOCUMENTS

FR 1129872 1/1957
JP 2527137 8/1996
(Continued)

OTHER PUBLICATIONS

Search Report.
(Continued)

*Primary Examiner* — Christopher P Jones
*Assistant Examiner* — Phillip Y Shao
(74) *Attorney, Agent, or Firm* — Alix, Yale & Ristas, LLP

(57) ABSTRACT

A device evacuates a chamber and purifies the gas extracted from said chamber of any foreign substances. The device comprises a dry-condensing vacuum pump having an input connected to the chamber to be evacuated and is suitable for maintaining the input pressure at a constant level at the output despite variable conditions. An intermediate line which connects to the output of the dry-condensing vacuum pump and a liquid ring vacuum pump, the input of which is connected to the intermediate line, are additionally provided. A corresponding method makes it possible to purify the gas of any foreign substances reliably and effectively.

20 Claims, 1 Drawing Sheet

(51) Int. Cl.
    *F04C 23/00*     (2006.01)
    *B01D 47/00*     (2006.01)
    *F04C 18/16*     (2006.01)

(52) U.S. Cl.
    CPC .......... *F04C 18/16* (2013.01); *F04C 2220/12* (2013.01); *F04C 2240/81* (2013.01); *F04C 2280/02* (2013.01)

(56) References Cited

U.S. PATENT DOCUMENTS

| | | |
|---|---|---|
| 5,326,383 A | 7/1994 | Harris |
| 5,458,862 A | 10/1995 | Glawion |
| 5,975,857 A | 11/1999 | Kuhn et al. |
| 6,375,431 B1 | 4/2002 | Ando |
| 6,558,131 B1 | 5/2003 | Nash, Jr. |
| 7,465,375 B2 | 12/2008 | Demers et al. |
| 2002/0131870 A1 | 9/2002 | Puech |
| 2004/0173312 A1 | 9/2004 | Shibayama et al. |
| 2011/0142740 A1* | 6/2011 | Lundahl ................ F04C 19/001 423/242.1 |

FOREIGN PATENT DOCUMENTS

| | | |
|---|---|---|
| JP | 10-238462 | 9/1998 |
| WO | WO1989012169 | 12/1989 |

OTHER PUBLICATIONS

English Translation of FR1129872.
Korean Office Action.
English Translation of Korean Office Action.

\* cited by examiner

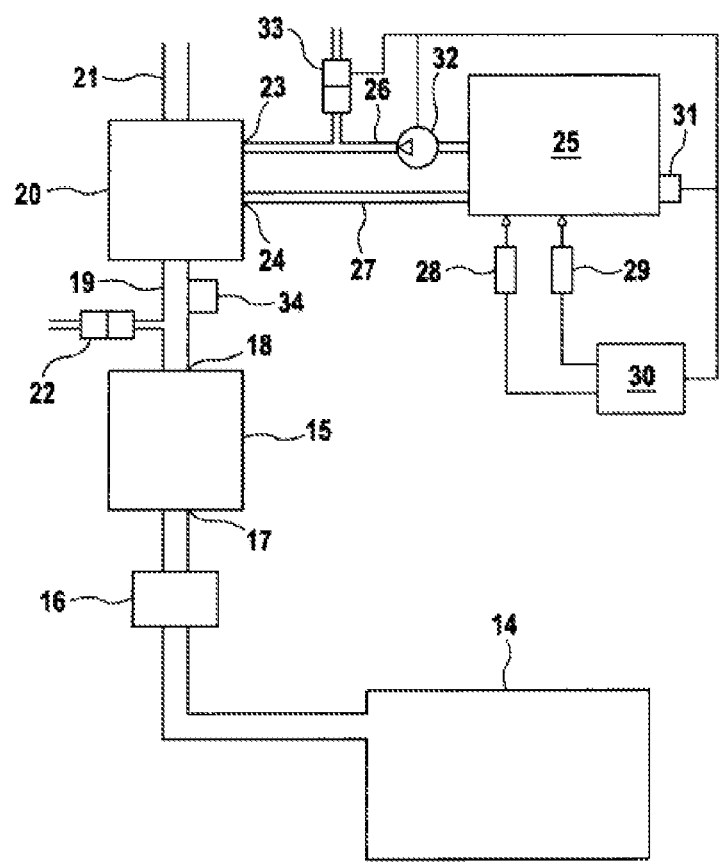

DEVICE AND METHOD FOR EVACUATING A CHAMBER AND PURIFYING THE GAS EXTRACTED FROM SAID CHAMBER

BACKGROUND

The invention relates to a device by means of which a chamber can be evacuated and the gas that is extracted from the chamber can be purified of entrained foreign substances. The device comprises a dry-compression vacuum pump, the inlet of which is connected to the chamber to be evacuated. The vacuum pump is suitable for keeping the inlet pressure constant despite variable conditions at the outlet, in particular despite variable pressure at the outlet. The invention also relates to a corresponding method.

Such devices may be used for example in deposition processes, such as, for example, CVD (Chemical Vapor Deposition) processes. CVD processes are utilized in many industrial sectors to produce coatings on different substrates at reduced pressure. For this purpose, gaseous metal compounds are converted into the desired coating system on the substrate surface at high temperatures and/or with plasma assistance. The relatively high gas pressures that can be realized permit high growth rates and have thus become widely used in all sectors of vacuum coating technology. A disadvantage of said high growth rates is that the deposition reactions take place not only on the substrate, but also in all regions of the coating installation. This applies not only to the process chamber walls, but also to the lines and devices between the process chamber and the outlet for the waste gases. Furthermore, the gaseous outlet and intermediate products are generally toxic and corrosive, and such CVD installations are thus always also equipped with a corresponding waste-gas treatment arrangement.

In modern CVD installations, to remove the deposits in the process chamber, etching processes are performed between the process steps, which etching processes convert the deposits in the process chamber into easily evaporable substances. A typical representative of said substances is ammonium chloride which tends to repeatedly build up on the walls further along the line. This applies in particular to the vacuum pump and to the pressure side of the vacuum pump, because here, in accordance with the law of continuity, the volume flow rate decreases significantly and thus makes it possible for the solid substances to build up.

To solve the problems resulting from this, there are nowadays basically two solution strategies used in industrial installations. One strategy is the installation of cooling traps downstream of the process chamber, with a heated line to the cooling trap, in order to accumulate the condensable substances at one location. This approach has the disadvantage that the cooling traps must be cleaned/evacuated at regular intervals. The other strategy is intensive heating of the lines and the adding of extensive amounts of inert gas in order to achieve an adequate volume flow rate even on the pressure side of the vacuum pump. Disadvantages here are the energy consumption and the thermal and thermally corrosive loading of the pipelines, valves, etc. Furthermore, the inert gas flow places a burden on the waste-gas purification arrangement, which is generally composed of a waste-gas scrubber. Furthermore, waste-gas scrubbers are highly susceptible to blockage at the gas inlet, because the temperature drops significantly here in the case of a high pressure and low volume flow rate.

Taking the prior art mentioned in the introduction as a starting point, a device and a method is proposed by which the gas that is extracted from the chamber can be purified in an expedient and reliable manner.

In many applications, it is highly important that the pressure in the chamber to be evacuated (for example the process chamber of the CVD process) can be kept reliably constant. The chamber thus has connected to it a dry-compression vacuum pump, which can perform this task even if the conditions at the outlet of the pump cannot be reliably kept constant. Basically, a pump is suitable for keeping the inlet pressure constant despite variable conditions at the outlet only if the pump comprises a multiplicity of working chambers arranged in series. The inlet and outlet are then separated from one another by a multiplicity of sealing gaps. An example of a pump which can perform this task is a screw-type vacuum pump. An example of a pump which is not suitable for keeping the inlet pressure constant despite variable conditions at the outlet is a Roots-type pump. Here, the inlet and outlet are separated from one another by only one sealing gap, and therefore a change at the outlet has a direct effect on the conditions at the inlet owing to the leakage flow. Roots-type pumps are thus typically used as forepumps in an arrangement comprising multiple pumps. Conventional pump arrangements having a Roots-type pump as a forepump, such as are described, for example, in FR 1129872 and in U.S. Pat. No. 3,956,072, have nothing to do with the invention.

A liquid ring vacuum pump is connected to the outlet of the dry-compression vacuum pump via an intermediate line. The liquid ring vacuum pump would not be suitable for being directly connected to the chamber to be evacuated, for two reasons. Firstly, the liquid ring vacuum pump cannot generate a vacuum lower than the vapor pressure of the operating liquid. A lower pressure is, however, often required in the chamber to be evacuated. Secondly, a vapor partial pressure can escape from the operating liquid of the liquid ring vacuum pump in the direction of the suction side. This is not acceptable, because it must be possible to maintain defined conditions in the chamber to be evacuated.

SUMMARY

In the chamber to be evacuated, an atmosphere prevails in which the solid substances are dispersed in the gas. To prevent the solid substances from precipitating and being precipitated on elements of the pump as the gas passes through the device, it is firstly necessary for the pressure of the gas to be kept low, and it is secondly necessary for the volume flow rate to be kept high, such that the gas moves at an adequate speed.

Against this background, the dry-compression vacuum pump is used to increase the pressure, but to a value that is still considerably lower than atmospheric pressure. Thus, in the intermediate line, the pressure is low enough, and the speed high enough, that condensation does not yet take place. Condensation occurs for the first time in the liquid ring vacuum pump. Here, the substances can however be immediately absorbed by the operating liquid of the liquid ring vacuum pump and transported away, such that as a result, undesired deposits do not form. The expression "condensation" encompasses in particular a situation in which a substance changes directly from the gaseous phase into the solid phase. A further waste-gas scrubber downstream of the liquid ring vacuum pump is not required in the device.

The pressure at the inlet side of the dry-compression vacuum pump may for example lie between 1 mbar and 40 mbar, preferably between 2 mbar and 30 mbar, and more preferably between 5 mbar and 20 mbar. The pressure in the intermediate line may for example lie between 80 mbar and 300 mbar, preferably between 100 mbar and 150 mbar.

A further possibility for counteracting the condensation resides in a scavenging gas being fed in at the outlet of the dry-compression vacuum pump and/or in the intermediate line. Feeding the scavenging gas in said region has the advantage that a considerable increase in the volume flow rate, and thus speed, can be achieved with a small amount of gas. The opening for the feed of the scavenging gas may be a suitably arranged valve. It is also possible for the scavenging gas to be fed through an opening which is formed in the dry-compression vacuum pump between a shaft and the housing and which must be sealed off in any case. In this case, the scavenging gas can simultaneously serve as barrier gas of the dry-compression vacuum pump.

The liquid ring vacuum pump is preferably provided with an inlet and an outlet for the operating liquid. Said inlet and outlet are furthermore preferably designed so as to permit an inflow and an outflow of the operating liquid during the operation of the pump. This is desirable in order that operating liquid that has been enriched with foreign substances can be replaced with fresh operating liquid. In this embodiment, the pump may be designed such that the housing of the liquid ring vacuum pump is provided with an inlet opening for the inflow of the operating liquid and with an outlet opening for the outflow of the operating liquid. Configurations are also possible in which the operating liquid initially emerges from the pump through the same outlet as the gas flow. The operating liquid can be separated from the gas flow in the subsequent line.

There are numerous possibilities for the flow of the operating liquid. The liquid that is discharged from the liquid ring vacuum pump may be disposed of and replaced with a corresponding amount of fresh liquid. Also conceivable is a circuit in which the liquid discharged from the liquid ring vacuum pump is partially or entirely fed back to the pump. Provision may also be made for the heat of compression to be dissipated by means of an installed heat exchanger.

In all cases, it is desirable for the operating liquid to be disposed of only when it has become sufficiently enriched with foreign substances. For this purpose, provision may be made for the conductivity of the operating liquid to be determined by means of a sensor. The content of foreign substances can be inferred from the conductivity. The sensor may be arranged for example on the liquid ring vacuum pump or on a line or on a vessel through which the operating liquid is conducted. The device may be designed such that operating liquid is fed in and discharged only in required amounts in a manner dependent on the content of foreign substances.

The operating liquid may be water. It is also possible for the operating liquid to contain a solvent which is coordinated with the foreign substances contained in the gas. Such a solvent can contribute to particularly effective purification of the gas.

In the gas, there may sometimes be entrained substances which are either acidic or alkaline. In this case, for the purification of the gas, it may be expedient for the operating liquid to correspondingly be oppositely alkaline or acidic. For this purpose, a pH sensor may be provided in order to determine the pH value of the operating liquid. Furthermore, a control device may be provided which adjusts the pH value as a function of the measurement values from the pH sensor. This may be realized, for example, by virtue of water being added to the operating liquid if it is sought merely to neutralize the operating liquid. It is also possible for an acid or an alkaline solution to be fed to the operating liquid if the pH value is to be adjusted in the corresponding direction.

Some foreign substances in the gas can best be eliminated by combustion. For this purpose, a combustion device may be provided which is preferably arranged in the intermediate line. Said combustion device may operate with thermal combustion, that is to say with a flame fed with natural gas, for example, which flame is brought into contact with the gas. Also possible is a catalytic combustion in which the gas is brought into contact with a heated surface composed of a catalytic material. By means of the combustion, the foreign substances in the gas can be brought into a form in which they are absorbed by the operating liquid.

The invention also relates to a method for evacuating a chamber and for purifying the gas that is extracted from the chamber of entrained foreign substances. In the method, gas is drawn out of the chamber by suction. The pressure is increased to a value below atmospheric pressure, wherein a pump is used which is suitable for keeping the inlet pressure constant even if the outlet pressure is variable. The gas is conducted onward to a liquid ring vacuum pump which outputs the gas at atmospheric pressure. In the method, the pressure and the volume flow rate of the gas that is conducted onward to the liquid ring vacuum pump are set such that condensation of the foreign substances does not yet take place. The foreign substances condense for the first time in the liquid ring vacuum pump, and are absorbed by the operating liquid in the latter and discharged. The method may be refined with further features that have been described above with reference to the device.

BRIEF DESCRIPTION OF THE DRAWINGS

The invention will be described by way of example below with reference to the appended drawing and on the basis of advantageous embodiments. In the drawing:

FIG. 1 shows an embodiment of the device.

DETAILED DESCRIPTION

A process chamber of a CVD process forms the chamber 14 to be evacuated. The inlet 17 of a screw-type vacuum pump 15 is connected to the chamber 14 to be evacuated. A pressure reduction valve 16 is arranged in the line between the chamber 14 to be evacuated and the screw-type vacuum pump 15, by means of which pressure reduction valve the pressure in the chamber 14 can be set to be higher than the pressure at the inlet 17 of the screw-type vacuum pump 15. In the present example, a pressure of 80 mbar prevails in the chamber 14, and a pressure of 20 mbar prevails at the inlet 17 of the screw-type vacuum pump 15. The screw-type vacuum pump 15 has the task of keeping the pressure at the inlet 17 constant even if the conditions at the outlet 18 of the screw-type vacuum pump 15 vary. By means of the screw-type vacuum pump 15, the gas is compressed to a pressure of approximately 120 mbar and output via the outlet 18.

The outlet 18 of the screw-type vacuum pump 15 is adjoined by an intermediate line 19 which leads to a liquid ring vacuum pump 20. The liquid ring vacuum pump 20 compresses the gas further such that it can be output at atmospheric pressure via the outlet 21.

The screw-type vacuum pump 15 and the liquid ring vacuum pump 20 are coordinated with one another such that, in the intermediate line 19, the pressure of the gas is low enough, and the volume flow rate high enough, that no condensation of the foreign substances entrained by the gas takes place therein. Condensation occurs the first time as a result of the further pressure rise in the liquid ring vacuum pump 20. The foreign substances are then immediately absorbed by the operating liquid of the liquid ring vacuum pump 20 and consequently cannot be deposited on elements of the device.

Also arranged in the intermediate line 19 is a valve 22 via which air from the environment can be admitted, as scavenging gas, into the intermediate line 19. By virtue of scavenging gas being admitted at this location, a small volume of scavenging gas is sufficient to considerably increase the volume flow rate in the intermediate line 19. The deposition of the foreign substances can thus be counteracted further by means of the scavenging gas.

During the course of operation, the operating liquid is enriched with an ever-increasing amount of foreign substances. It is thus possible for new operating liquid to be fed to the liquid ring vacuum pump 20 and for old operating liquid to be discharged from the liquid ring vacuum pump, respectively, via an inlet 23 and an outlet 24 during operation. Here, a closed circuit for the operating liquid exists between the liquid ring vacuum pump 20 and a storage vessel 25 via a feed line 26 and a return line 27. Accordingly, during operation, operating liquid is continuously exchanged, whereby the material present in the storage vessel 25 is enriched with foreign substances to an ever greater extent.

The conductivity of the operating liquid in the storage vessel 25 is continuously measured by means of a sensor 28. The content of foreign substances can be inferred from the conductivity, such that the operating liquid can cease to be used when a predefined threshold value is exceeded.

The measurement values from the sensor 28 are fed to a control unit 30. If the threshold value is exceeded, the control unit 30 actuates a valve 31, such that some of the no longer usable operating liquid is extracted from the vessel 25. The vessel 25 is subsequently filled with a corresponding amount of fresh operating liquid. Furthermore, by means of the control unit 30, a pump 32 is actuated by means of which the operating liquid is fed to the liquid ring vacuum pump 20.

The pH value of the operating liquid in the storage vessel 25 is measured by means of a further sensor 29. If, for example, acidic foreign substances are entrained in the gas, it may be advantageous, for the purification of the gas, for the operating liquid to be alkaline. The absorption of the acidic foreign substances has the effect that the pH value of the operating liquid falls until, at some point, the absorption of the acidic foreign substances is no longer ensured. This is determined by means of the sensor 29. When a corresponding measurement value is output by the sensor 29, the device 30 actuates a valve 33 by means of which additional alkaline solution is fed to the operating liquid. In this way, the operating liquid permanently maintains the desired alkaline characteristics.

If the foreign substances entrained in the gas are alkaline, the procedure using the sensor 29, the control device 30 and the valve 33 is exactly reversed.

Finally, a combustion device 34 is arranged in the intermediate line 19. Said combustion device is activated if foreign substances that can be absorbed by the operating liquid of the liquid ring vacuum pump 20 only after combustion are entrained in the gas.

The invention claimed is:

1. A method for evacuating a vacuum coating processing chamber, said vacuum coating processing chamber having an atmosphere of a gas and solid substances dissolved in said gas, said method comprising:
   drawing the gas out of the vacuum coating processing chamber;
   increasing the pressure of the gas, with a first pump to a value below atmospheric pressure, the first pump having an inlet pressure and an outlet pressure, wherein the first pump is configured for keeping the inlet pressure constant even if the outlet pressure is variable, wherein an inlet and an outlet of the first pump are separated from one another by a plurality of sealing gaps in series, the inlet being connected to the vacuum coating processing chamber, and wherein an intermediate line connects to the outlet of the first pump;
   conducting the gas onward to a liquid ring vacuum pump which outputs the gas at atmospheric pressure, the liquid ring vacuum pump having an operating liquid and an inlet connected to the intermediate line, said liquid ring vacuum pump absorbing solid substances condensing from the gas into the operating liquid; and
   replacing the operating liquid with fresh operating liquid when the operating liquid has been enriched with absorbed solid substances during operation of the liquid ring vacuum pump.

2. The method of claim 1, wherein the first pump comprises a dry-compression vacuum pump.

3. The method of claim 1, wherein the first pump generates a pressure of between 1 mbar and 40 mbar at the inlet side.

4. The method of claim 1, wherein the first pump generates a pressure of between 80 mbar and 300 mbar in the intermediate line.

5. The method of claim 1, wherein an opening for a supply of scavenging gas is provided at the outlet of the first pump and/or in the intermediate line.

6. The method of claim 5, wherein the first pump has a housing characterized in that the opening is a gap that exists between a shaft and the housing of the first pump.

7. The method of claim 1, wherein the liquid ring vacuum pump has an operating liquid and is provided with an inlet and an outlet for the operating liquid, which inlet and outlet permit an inflow and outflow of the operating liquid during operation of the liquid ring vacuum pump.

8. The method of claim 1, wherein the operating liquid has a conductivity, characterized in that a sensor determines the conductivity of the operating liquid.

9. The method of claim 7, wherein the operating liquid has an inflow and an outflow and a concentration of foreign substances, characterized in that a control device adjusts the inflow and the outflow of the operating liquid as a function of the concentration of foreign substances in the operating liquid.

10. The method of claim 1, wherein the operating liquid has a concentration of foreign substances characterized in that the operating liquid of the liquid ring vacuum pump contains a solvent which is coordinated with the foreign substances contained in the gas.

11. The method of claim 1, wherein the operating liquid has a pH value, characterized in that a pH sensor determines the pH value of the operating liquid.

12. The method of claim 11, wherein the sensor determines measurement values, characterized in that a control device adjusts the pH value of the operating liquid as a function of the measurement values from the pH sensor.

13. The method of claim 1, wherein a combustion device is arranged in the intermediate line.

14. The method of claim 1, wherein the first pump generates a pressure of between 2 mbar and 30 mbar at the inlet side.

15. The method of claim 1, wherein the first pump generates a pressure of between 5 mbar and 20 mbar at the inlet side.

16. The method of claim 1, wherein the first pump generates a pressure of between 100 mbar and 150 mbar in the intermediate line.

17. The method of claim 3, wherein the first pump generates a pressure of between 100 mbar and 150 mbar in the intermediate line.

18. The method of claim 3, wherein an opening for a supply of scavenging gas is provided at the outlet of the first pump and/or in the intermediate line.

19. The method of claim 4, wherein an opening for a supply of scavenging gas is provided at the outlet of the first pump and/or in the intermediate line.

20. The method of claim 3, wherein the liquid ring vacuum pump has an operating liquid and is provided with an inlet and an outlet for the operating liquid, which inlet and outlet permit an inflow and outflow of the operating liquid during operation of the liquid ring vacuum pump.

* * * * *